United States Patent
Kampanakis et al.

(10) Patent No.: US 12,200,105 B1
(45) Date of Patent: Jan. 14, 2025

(54) ASYMMETRIC COMPUTER-IMPLEMENTED STORAGE CRYPTOGRAPHY

(71) Applicant: Amazon Technologies, Inc., Seattle, WA (US)

(72) Inventors: Panagiotis Kampanakis, Apex, NC (US); Jake Massimo, London (GB); Brian Igleheart, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 378 days.

(21) Appl. No.: 17/855,563

(22) Filed: Jun. 30, 2022

(51) Int. Cl.
*H04L 9/06* (2006.01)
*H04L 9/08* (2006.01)

(52) U.S. Cl.
CPC ............ *H04L 9/0631* (2013.01); *H04L 9/085* (2013.01); *H04L 9/0861* (2013.01)

(58) Field of Classification Search
None
See application file for complete search history.

(56) References Cited

U.S. PATENT DOCUMENTS

| | | | |
|---|---|---|---|
| 2016/0283723 A1* | 9/2016 | Roth | H04L 9/0897 |
| 2019/0342079 A1* | 11/2019 | Rudzitis | G06F 21/602 |
| 2023/0299953 A1* | 9/2023 | Doi | H04L 9/0855 380/255 |
| 2023/0318826 A1* | 10/2023 | Anand | H04L 9/3093 380/286 |

* cited by examiner

Primary Examiner — Philip J Chea
Assistant Examiner — James Ross Hollister
(74) Attorney, Agent, or Firm — Davis Wright Tremaine LLP

(57) ABSTRACT

Techniques and systems can obtain a first private key usable with a classical cryptography algorithm and a second private key usable with a post-quantum cryptography algorithm based on classical and post-quantum public keys hosted by a computer-implemented storage of an online service provider. A plurality of keys to perform a cryptography operation on data hosted by the computer-implemented storage can be generated, the plurality of keys generated based on at least the first and second private keys and a cryptography derivation function identified in the computer-implemented storage. The plurality of keys can be used to perform the cryptography operation on the data hosted by the computer-implemented storage.

20 Claims, 7 Drawing Sheets

ASYMMETRIC COMPUTER-IMPLEMENTED STORAGE CRYPTOGRAPHY

BACKGROUND

Security is an important component of computer-implemented storage, as such storage often contains sensitive data. Users rely on service providers to deploy critical technologies to ensure that their data, hosted by online computer-implemented storage, remains secure against a growing threat of global online attackers. Hosted data is generally secured through cryptography techniques that facilitate the security of the data. Despite major efforts to keep data from being compromised by unauthorized entities, data compromising techniques used by malicious entities remain successful and are constantly evolving. Keeping pace with this evolution and updating technology to keep data secure require significant resources.

BRIEF DESCRIPTION OF THE DRAWINGS

Various techniques will be described with reference to the drawings, in which.

DETAILED DESCRIPTION

Figure 1:
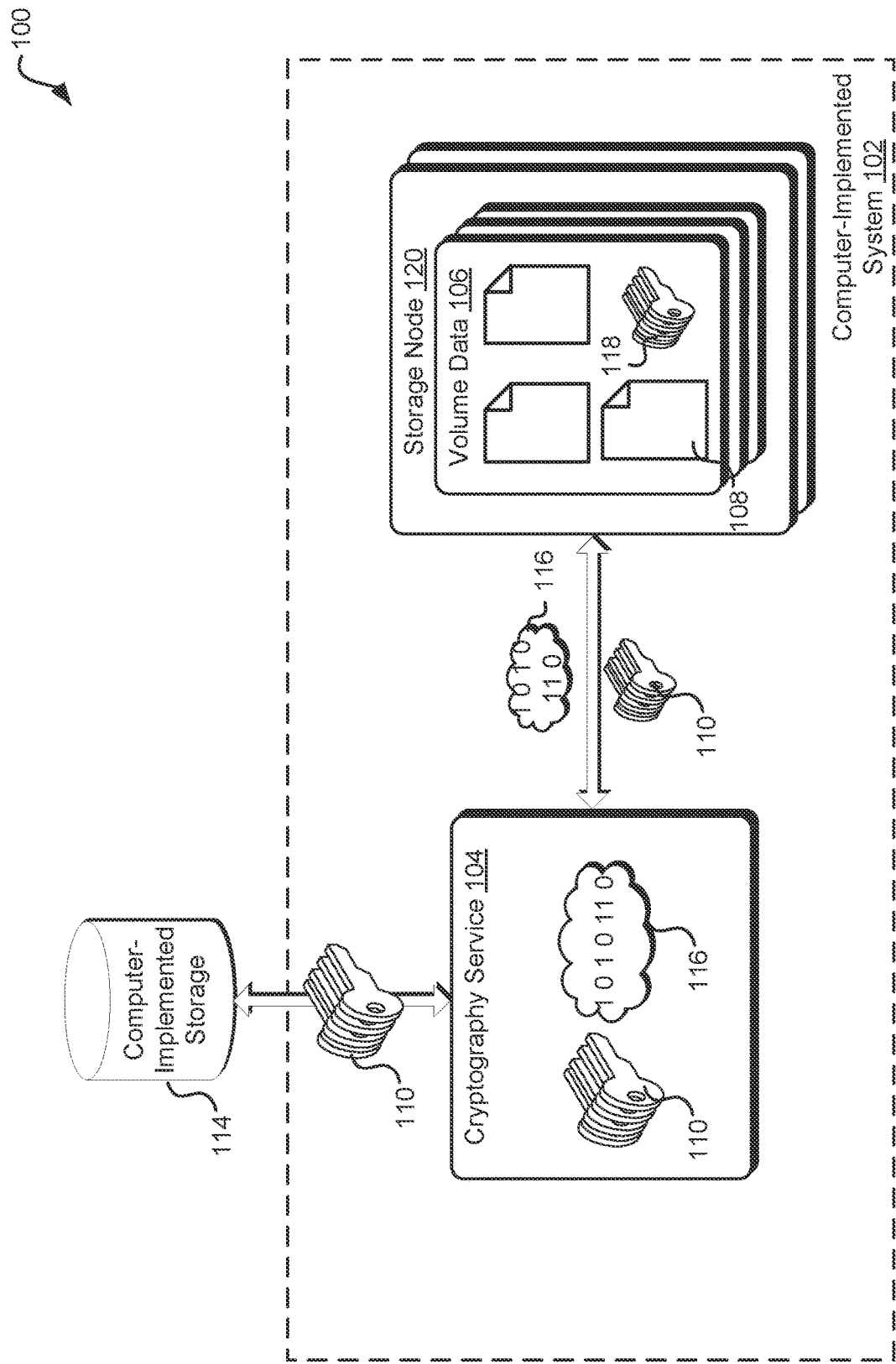
FIG. 1 illustrates an example system environment that can generate cryptographic material, according to at least one embodiment.

The described systems and techniques provide cryptography operations for large volumes of data, such as data stored in computer-implemented storage accessed by various entities via the Internet. In one example, the described systems and techniques provide block level cryptography operations, such as decryption and encryption of data, using asymmetric cryptography techniques.

An online service provider can provide data storage for customers. The data storage can be associated with a data volume or several data volumes. These data volumes can be hosted by computer-implemented storage, such as hard disk drives and/or solid-state drives. Hard disk drives, solid-state drives, or other computer-implemented storage can also be referred to herein as storage nodes.

Data volumes can be maintained in a storage node or across several storage nodes. The storage nodes can implement block-based storage of data. A service of the online service provider can be used to provide block level storage for storing data volumes on the storage nodes. The same service, or another service, can provide cryptography services for the data volumes on the storage nodes. For example, the online service provider can provide a service that encrypts and decrypts data volumes on the storage nodes. Such encrypting and decrypting, by the service, can be carried out for a portion of the data of a data volume or the entirety of the data volume.

The service that provides cryptography services for the one or more data volumes on the one or more storage nodes can include asymmetric cryptography services. The service can couple to a storage node that includes a data volume stored on behalf of a customer of the online service provider. The service can generate or obtain first and second private keys. The first private key can be usable with a classical cryptography algorithm, such as elliptic curve cryptography (ECC), or elliptic-curve Diffie-Hellman (ECDH). The second private key can be usable with a post-quantum cryptography algorithm, such as one or more algorithms standardized by the National Institute of Standards and Technology (NIST). In one example, the service can generate the first and second private keys on behalf of the customer. In another example, the first and second private keys can be supplied by the customer.

The service that provides cryptography services can generate or obtain a first public key corresponding to the first private key. This first public key can be usable with the classical cryptography algorithm. The first private key and the first public key can be referred to herein as a classical key pair usable with the classical cryptography algorithm. The service can also generate or obtain a second public key corresponding to the second private key. This second public key can be usable with the post-quantum cryptography algorithm. The second private key and the second public key can be referred to herein as a post-quantum key pair usable with the post-quantum cryptography algorithm. In one example, the service can generate the first public key and the second public key on behalf of the customer. In another example, the first and second public keys can be supplied by the customer.

The service that provides cryptography services can also generate a post-quantum encapsulation. The post-quantum encapsulation is generated using the second public key that is usable with the post-quantum cryptography algorithm. The service uses a post-quantum encapsulation function that receives as an input the second public key and outputs a post-quantum shared secret and a ciphertext that encapsulates the post-quantum shared secret to the second public key.

In at least one example, the ciphertext is generated by the cryptography service. In at least one example, the ciphertext is generated by one or more storage nodes that includes volume data. This volume data can be caused to be encrypted or decrypted. Furthermore, the post-quantum shared secret can be removed from the cryptography service once the post-quantum shared secret or second private key and the ciphertext are stored externally of the cryptography service.

The service that provides cryptography services can also generate various ephemeral key pairs and/or other ephemeral cryptographic material, which can also be referred to as cryptography material. For example, the service can generate an ephemeral classical asymmetric key pair corresponding to the first public key and the first private key. Furthermore, the service, as indicated, can generate a ciphertext that encapsulates a post-quantum shared secret to the post-quantum public key. In an example, the ephemeral cryptographic material can be generated by one or more storage nodes that includes volume data, such as volume data for encryption or decryption.

To provide various cryptography services for a customer's one or more storage nodes that include volume data, the cryptography service stores at least the first public key, the second public key, an ephemeral classical public key, and the ciphertext. The cryptography service can provide the first public key, the second public key, the ephemeral classical public key, and the ciphertext to the storage node, which stores the provided cryptographic material as metadata hosted by the storage node. The cryptography service can also, optionally, store the first private key and the second private key. The metadata hosted by the storage node can include an identifier associated with an appropriate key derivation function (KDF) usable to derive keys, based at least on the cryptographic material of the metadata storage node.

The cryptography service can generate the ephemeral classical private key and the post-quantum shared secret. In another example, the first private key and the second private key can be stored at an external computer-implemented storage location that is accessible by the cryptography service. Furthermore, the ephemeral classical private key and the post-quantum shared secret can be stored at an external computer-implemented storage location that is accessible by the cryptography service.

The storage node, associated with a customer, can incorporate computer-executable instructions, that can be executed by a processor, to perform a cryptography operation on volume data hosted by the storage node. For example, the computer-executable instructions can be executed to encrypt or decrypt the volume data. To perform the cryptography operation, the computer-executable instructions can be executed to identify the cryptographic material of the metadata. Furthermore, the computer-executable instructions can be executed to retrieve the first and second private keys. These first and second private keys can be retrieved from the cryptography service or from an external source identified by the customer.

The computer-executable instructions can derive a classical shared secret and a post-quantum shared secret. To derive the classical shared secret, the computer-executable instructions use a classical key agreement protocol, such as the ECDH protocol or similar classical key agreement protocol, to produce the classical shared secret. In one example, the classical key agreement protocol uses the first private key and the ephemeral classical public key to generate the classical shared secret. To produce the post-quantum shared secret, a decapsulation algorithm is used by the computer-executable instructions to decapsulate the ciphertext encapsulating the post-quantum shared secret. In at least one example, the decapsulation algorithm uses the second private key and the ciphertext to decapsulate the post-quantum shared secret.

The two shared secrets are concatenated and are used to derive two symmetric keys usable to encrypt or decrypt the volume data hosted by the storage node. In an example, the computer-executable instructions can be executed to use the KDF, in a key schedule for example, with the concatenated shared secrets and an info parameter to generate the two symmetric keys usable to encrypt or decrypt the volume data. In an example, the two keys are usable with an XEX Tweakable Block Ciphertext Stealing (XTS)-Advanced Encryption Standard (AES) encryption scheme to encrypt or decrypt the volume data. In a particular example, the two keys are 256 bit AES-256-XTS keys generated by the KDF.

Once the two keys are generated, the computer-executable instructions can be executed by the storage node to encrypt or decrypt the volume data using the two keys.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) security is enhanced by eliminating the need to store private keys at the data storage level; (2) security is enhanced by introducing asymmetric encryption for large data volumes, thereby eliminating the need to use symmetric key encryption for large data volumes; and (3) security is enhanced by introducing post-quantum encryption cryptography techniques for large data volumes.

FIG. 1 illustrates an example system environment 100 that can generate cryptographic material, according to at least one embodiment. The example system environment 100 can include a computer-implemented system 102. The computer-implemented system 102 can comprise various computational resources, including virtual computer instances, applications, services, processes, web servers, computer storage, database instances, networking components, and so on. In some embodiments, the computer-implemented system 102 can be hosted in the cloud by an online service provider.

The computer-implemented system 102 can comprise hosted multi-tenant provider networks. The computer-implemented system 102 can be associated with a number of networks, such as the Internet and/or one or more private networks. Clients, such as client computing devices or other interfaces, can use the network to interface with the computer-implemented system 102. Clients can include entities or individuals that contract with an operator associated with the computer-implemented system 102 to obtain computational services provided by the operator of the computer-implemented system 102. In some embodiments, the client can be resource owners, resource developers, compliance managers, other users or entities, and so on.

In at least one embodiment, the computer-implemented system 102 can include a cryptography service 104. In at least one embodiment, the cryptography service 104 includes a key management service (KMS). In general, a KMS is a service that allows customers to create and control encryption keys that can be used to encrypt and decrypt the customers' data. In one embodiment, the KMS is a service of the computer-implemented system 102 and can be integrated with other services of the service provider system to help customers protect data stored in the services. The KMS can also provide customers with the ability to encrypt and decrypt data outside of the computer-implemented system 102, for example, within external customer networks. In other embodiments, the KMS is a third-party service managed outside of the computer-implemented system 102 and can similarly be used to allow customers to protect data at the computer-implemented system 102 and locally at customer networks. In general, the KMS can be any key management system that is accessible to at least one component located in the customer's network and/or at least one component of the computer-implemented system 102.

The cryptography service 104 can provide cryptography operations, such as asymmetric encryption operations, for data at the block level. The cryptograph operations can leverage hybrid public-key encryption (HPKE) and/or Elliptic Curve Integrated Encryption Scheme (ECIES), see Section 5.1 of Standards for Efficient Cryptography SEC 1: Elliptic Curve Cryptography, version 2, ANSI X9.63 (ECIES), and/or IEEE 1363a (IEEE1363), ISO/IEC 18033-2). In at least one embodiment, the cryptography service 104 can provide cryptography operations for volume data 106. The volume data 106 can be stored on one or more computer-implemented storage nodes 120 of the computer-implemented system 102. In at least one embodiment, the computer-implemented storage nodes 120 are co-located in a data center hosting many computer-implemented storage nodes 120. In at least one embodiment, the computer-implemented storage nodes 120 are distributed storage nodes hosted by a plurality of data centers that host many computer-implemented storage nodes 120. As illustrated, there may be a plurality of volume data 106. Each of the volume data 106 can comprise data 108, such as customer data associated with customers of an online service provider.

The cryptography service 104 can generate and/or obtain cryptographic material that can be used for the cryptography operations provided by the cryptography service 104. In at least one embodiment, the cryptographic material can include a plurality of keys 110. In addition, in at least one embodiment, the cryptographic material can include ciphertext 116. In at least one embodiment, some of the plurality of keys 110 can be obtained and/or stored externally in a computer-implemented storage 114. For example, one or more private keys associated with the plurality of keys 110 can be stored securely in the computer-implemented storage 114. In at least one embodiment, the computer-implemented storage 114 is associated with a customer of the online service provider. In at least one embodiment, the computer-implemented storage 114 can be associated with a hardware security module (HSM) or other similar security module that provides secure storage of cryptography keys. At least one embodiment, the computer-implemented storage 114 can comprise a cloud-HSM. In at least one embodiment, all the keys 110 are stored by the cryptography service 104 locally in the computer-implemented system 102. Thus, similarly, the computer-implemented system 102 and/or the cryptography service 104 can implement an HSM, cloud-HSM, or other similar security module that provides secure storage of cryptography keys and other cryptographic material.

The cryptography service 104 can generate or obtain first and second private keys that are associated with the keys 110. In at least one embodiment, the first and second private keys are obtained from the computer-implemented storage 114. The first private key can be usable with a classical cryptography algorithm, such as ECC, or ECDH. The second private key can be usable with a post-quantum cryptography algorithm, such as one or more algorithms standardized by NIST, such as Kyber post-quantum key encapsulation mechanism (KEM). In one example, the service can generate the first and second private keys on behalf of a customer that has volume data 106 hosted on computer-implemented storage, such as the storage node 120 of the computer-implemented system 102. In another example, the first and second private keys can be supplied by the customer, such as a customer associated with the computer-implemented a storage 114.

The cryptography service 104 that provides cryptography services can generate or obtain a first public key corresponding to the first private key. The first public key can also be associated with the keys 110. This first public key can be usable with the classical cryptography algorithm. The first private key and the first public key can be referred to herein as a classical key pair usable with the classical cryptography algorithm. The cryptography service 104 can also generate or obtain a second public key corresponding to the second private key. The second public key can also be associated with the keys 110. This second public key can be usable with the post-quantum cryptography algorithm. The second private key and the second public key can be referred to herein as a post-quantum key pair usable with the post-quantum cryptography algorithm. In one example, the cryptography service 104 can generate the first public key and the second public key on behalf of the customer. In another example, the first and second public keys can be supplied by the customer. For example, the first and second public keys, associated with the keys 110, can be provided by via the computer-implemented storage 114.

The cryptography service 104 can also generate a post-quantum encapsulation, using for example Kyber KEM. The post-quantum encapsulation, illustrated here as including ciphertext 116, is generated using the second public key that is usable with the post-quantum cryptography algorithm. The service 104 uses a post-quantum encapsulation function that receives as an input the second public key and outputs a post-quantum shared secret and the ciphertext 116 that encapsulates the post-quantum shared secret.

The cryptography service 104 that provides cryptography services can also generate various ephemeral key pairs and/or other ephemeral cryptographic material. For example, the service 104 can generate an ephemeral classical asymmetric key pair corresponding to the first public key and the first private key. Furthermore, the service 104 can generate a ciphertext corresponding to the ciphertext 116 that encapsulates the post-quantum shared secret. The ephemeral classical asymmetrical key pair can be associated with the keys 110. In at least one embodiment, the ephemeral key pairs and/or other ephemeral cryptographic material can be generated external of the cryptography service 104. In at least one embodiment, the ephemeral key pairs and/or the other ephemeral cryptographic material can be generated by a storage node, such as a storage node 120. In at least one embodiment, the ciphertext, such as the ciphertext 116, is generated external of the cryptography service 104. In at least one embodiment, the ciphertext is generated by the storage node, such as the storage node 120.

As used herein, in at least one embodiment, some cryptographic material (e.g., keys or ciphertext) is considered to be "ephemeral" or temporary because it is generated for each execution of a cryptographic material establishment process and the generated ephemeral cryptographic material is temporary. The notion of "temporary" in at least one embodiment refers to the duration of a single session or some other limitation on the use of the cryptographic material, compared with static cryptographic material that usually has an expiry date set when issued (typically in the range of years) or are manually revoked because of a compromise. In at least one embodiment, the ephemeral cryptographic material can be generated on-the-fly, such as close to the anticipated use of the material, or the ephemeral cryptographic material can be generated or derived and stored in a pool of pre-generated ephemeral cryptographic material. To be deemed ephemeral, in at least one embodiment, the cryptographic material (temporary cryptographic material) is used only once. In at least one embodiment, the ephemeral cryptographic material is generated in a random or pseudorandom manner such that the cryptographic material is not predictable of being able to be derived from known data.

To provide various cryptography services for a customer's one or more storage nodes 120 that include volume data 106, the cryptography service 104 stores at least the first public key, the second public key, an ephemeral public key and the ciphertext. The stored cryptographic material can be associated with the keys 110 and/or the ciphertext 116. The cryptography service 104 can provide the first public key, the second public key, the ephemeral public key and the ciphertext to the storage node 120 including the volume data 106, which stores the provided cryptographic material as metadata hosted by the storage node 120. The cryptography service 104 can also, optionally, store the first private key and the second private key. The metadata hosted by the storage node 120 can include an identifier associated with an appropriate KDF usable to derive keys, based at least on the cryptographic material of the metadata hosted by the storage node 120 including the volume data 106. In at least one embodiment, the KDF is a keyed-hash message authentication code or hash-based message authentication code (HMAC)-secure hash algorithm (SHA)-256 or HMAC-SHA-512 algorithm.

The cryptography service 104 can optionally generate the ephemeral classical private key and the post-quantum shared secret. This cryptographic material can be associated with the keys 110. In another example, the first private key and the second private key can be stored at an external computer-implemented storage location that is accessible by the cryptography service 104, such as the computer-implemented storage 114. Furthermore, the ephemeral private key and the post-quantum shared secret can be stored at an external computer-implemented storage location that is accessible by the cryptography service 104, such as the computer-implemented storage 114.

The storage node 120, associated with a customer and hosting the volume data 106, can incorporate computer-executable instructions, that can be executed by a processor, to perform a cryptography operation on the volume data 106 hosted by the storage node 120. In at least one embodiment, the computer-executable instructions are associated with a cryptography driver of the storage node 120, which is responsible for carrying out cryptography operations on the volume data 106. For example, the computer-executable instructions can be executed to encrypt or decrypt the volume data 106. To perform the cryptography operation, the computer-executable instructions can be executed to identify the cryptographic material of the metadata. Furthermore, the computer-executable instructions can be executed to retrieve the first and second private keys. These first and second private keys can be retrieved from the cryptography service 104 or from an external source identified by the customer, such as the computer-implemented storage 114. In at least one embodiment, one or more identifiers associated with the cryptographic materials, such as one or more identifiers of public keys and/or ciphertext, are used by the storage node 122 obtain or retrieve the first and second private keys from the cryptography service 104 or the computer-implemented storage 114. Specifically, the one or more identifiers can be used by the cryptography service 104 and/or the computer-implemented storage 114 to identify the first and second private keys and/or ciphertext that correspond to the public keys and/or ciphertext hosted by the storage node 120 in metadata or the like.

The computer-executable instructions can derive a classical shared secret and a post-quantum shared secret, as illustrated as shared secrets 118 used to derive two symmetric keys. The computer-executable instructions use a classical key agreement protocol, such as the ECDH protocol or similar classical key agreement protocol, such as the Diffie-Hellman protocol, to derive the classical shared secret. In one example, the classical key agreement protocol uses the first private key and an ephemeral public key to produce the classical shared secret. In at least one embodiment, the post-quantum KEM uses the second private key and post-quantum ciphertext to produce the post-quantum shared secret. The post-quantum ciphertext encapsulates a randomly generated post-quantum shared secret. To produce the post-quantum shared secret, a decapsulation algorithm is used by the computer-executable instructions to decapsulate the ciphertext encapsulating the post-quantum shared key. In at least one embodiment, ECDH over curve P384 can be the algorithm for the classical static and ephemeral keypairs and Kyber KEM can be the algorithm for the post-quantum static keypair. The KDF could be HMAC-SHA-256 or HMAC-SHA-512.

The classical shared secret and the post-quantum shared secret can be used to generate two keys, also comprised in the secrets 118, usable to encrypt or decrypt the volume data 106 hosted by the storage node. In an example, the computer-executable instructions can be executed to use the KDF in a key schedule, for example, to generate the two keys usable to encrypt or decrypt the volume data 106. In at least one embodiment, the key schedule is a key derivation mechanism which uses the KDF in key derivation building blocks to derive pseudorandom keys of desired length from at least one shared secret, which can be completely random, pseudorandom, or deterministic. In an example, the two keys are usable with an XTS-AES, such as defined in IEEE Std 1619 or NIST SP 800-38E, encryption scheme to encrypt or decrypt the volume data 106. In a particular example, the two keys are 256-bit AES-256-XTS keys generated by the KDF. Once the two keys are generated, the computer-executable instructions can be executed by the storage node 120 to encrypt or decrypt the volume data 106.

Figure 2:
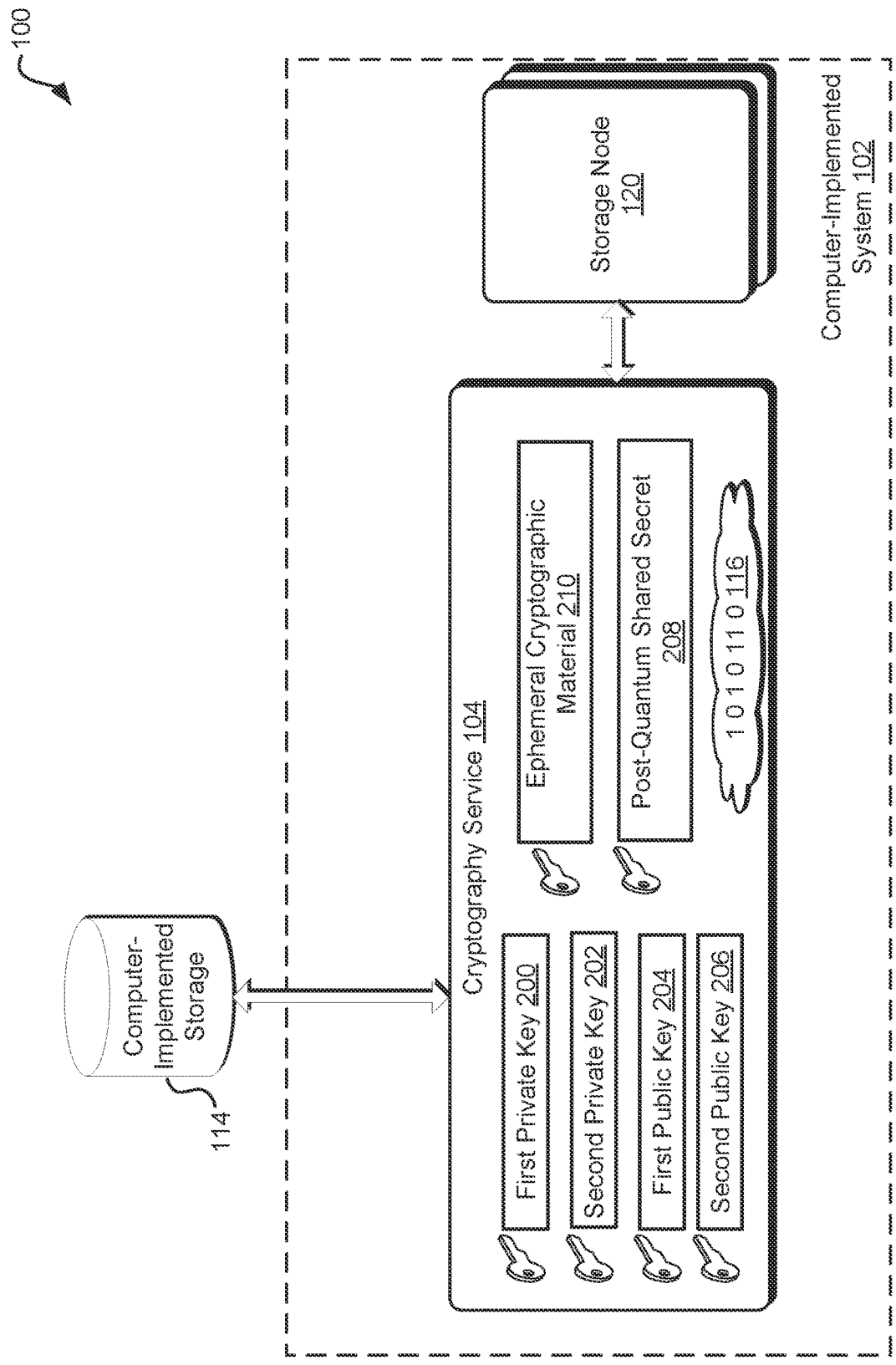
FIG. 2 illustrates details of a cryptography service of an example system environment that can generate cryptographic material, according to at least one embodiment.

FIG. 2 illustrates details of the cryptography service 104 of the example system environment 100 that can generate cryptographic material, according to at least one embodiment. Specifically, additional details of the cryptography service 104 are illustrated in FIG. 2. The cryptography service 104 can include a first private key 200 and a second private key 202. The first private key 200 can be usable with a classical cryptography algorithm, such as DH, or ECDH. The second private key 202 can be usable with a post-quantum cryptography algorithm, such as one or more post-quantum algorithms standardized by the NIST. In one example, the service 104 can generate the first and second private keys 200 and 202 on behalf of a customer. In another example, the first and second private keys 200 and 202 can be supplied by the customer. In at least one embodiment, the cryptography service 104 generates the keys 200 and 202. In at least one embodiment, the cryptography service 104 obtains the keys 200 and 202 from an external entity, such as a trusted key source or from a customer associated with the computer-implemented system 102 and/or an online service provider that provides the computer-implemented system 102. In at least one embodiment, one or more of keys 200 and 202 are static keys. In at least one embodiment, one or more of the keys 200 and 202 or ephemeral keys.

The cryptography service 104 that provides cryptography services can generate or obtain a first public key 204 corresponding to the first private key 200. This first public key 204 can be usable with the classical cryptography algorithm. The first private key 200 and the first public key 204 can be referred to herein as a classical key pair usable with the classical cryptography algorithm. The cryptography service 104 can also generate or obtain a second public key 206 corresponding to the second private key 202. This second public key 206 can be usable with the post-quantum cryptography algorithm. The second private key 202 and the second public key 206 can be referred to herein as a post-quantum key pair usable with the post-quantum cryptography algorithm. In one example, the cryptography service 104 can generate the first public key 204 and the second public key 206 on behalf of the customer. In another example, the first and second public keys 204 and 206 can be supplied by the customer. For example, the first and second public keys 204 and 206 can be provided by the computer-implemented storage 114. In at least one embodiment, one or more of keys 204-206 are static keys. The cryptography service 104 generates ephemeral versions of one or more of the keys 204-206.

The cryptography service 104 can also generate a post-quantum encapsulation. The post-quantum encapsulation, illustrated here as including ciphertext 116, is generated using the second public key 206 that is usable with the post-quantum cryptography algorithm. The service 104 uses a post-quantum encapsulation function that receives as an input the second public key 206 and outputs a post-quantum shared secret 208 and the ciphertext 116 that encapsulates the post-quantum shared secret 208. In at least one embodiment, the ciphertext 116 is ephemeral.

The cryptography service 104 that provides cryptography services can also generate various ephemeral key pairs and/or other ephemeral cryptographic material. For example, the service 104 can generate an ephemeral classical asymmetric key pair corresponding to the first public key 204 and the first private key 200. Furthermore, the service 104 can generate an ephemeral ciphertext corresponding to the ciphertext 116 that encapsulates the post-quantum shared secret 208. The ephemeral classical asymmetrical key pair and the ephemeral ciphertext corresponding to the ciphertext 116 can included in ephemeral cryptographic material 210.

To provide various cryptography services for a customer's one or more storage nodes 120 that include volume data 106, the cryptography service 104 stores at least the first public key 204, the second public key 206, an ephemeral public key 204 and the ciphertext 116, which can be associated with the ephemeral cryptographic material 210. The cryptography service 104 can provide the first public key 204, the second public key 206, the ephemeral public key 204 and the ciphertext 116 to the storage node 120 including the volume data 106, which stores the provided cryptographic material as metadata hosted by the storage node 120. The cryptography service 104 can also, optionally, store the first private key 200 and the second private key 202. The metadata hosted by the storage node 120 can include an identifier associated with an appropriate KDF usable to derive keys, based at least on the cryptographic material of the metadata hosted by the storage node 120 including the volume data 106. In at least one embodiment, the KDF is an HMAC-SHA-256 or HMAC-SHA-512 algorithm. The algorithm can be hosted by the storage node 120 and accessed or obtained through an identifier associated with the algorithm.

The cryptography service 104 can optionally generate an ephemeral version of the first private key 200 and an ephemeral version of the post-quantum shared secret 208. This cryptographic material can be associated with the ephemeral cryptographic material 210. In another example, the first private key 200 and the second private key 202 can be stored at an external computer-implemented storage location that is accessible by the cryptography service 104, such as the computer-implemented storage 114. Furthermore, the ephemeral private key 200 to and the post-quantum shared secret 208 can be stored at an external computer-implemented storage location that is accessible by the cryptography service 104, such as the computer having implemented storage 114.

Figure 3:
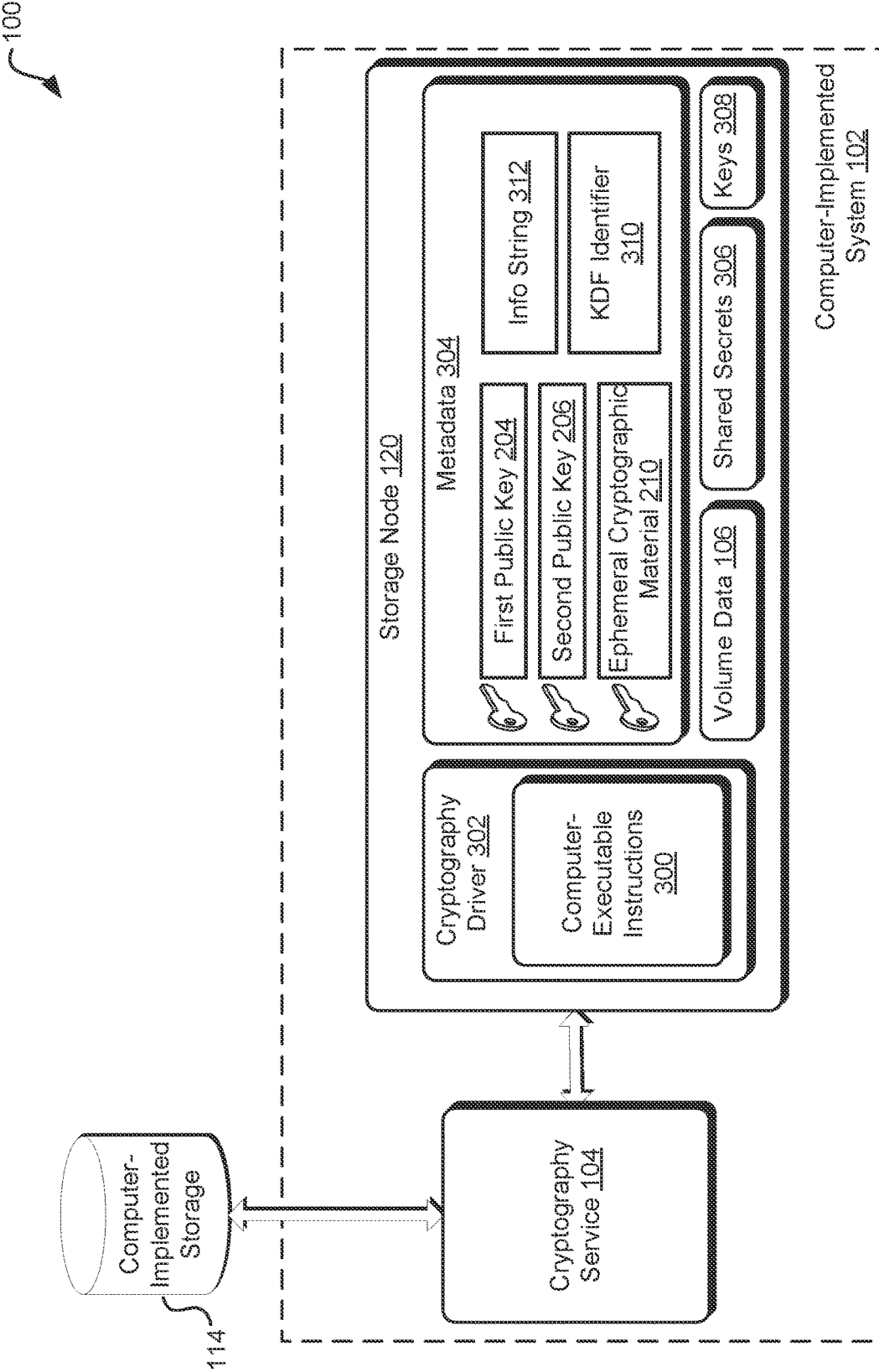
FIG. 3 illustrates details of a storage node of an example system environment that can generate cryptographic material, according to at least one embodiment.

FIG. 3 illustrates details of the storage node 120 of the example system environment 100 that can generate cryptographic material, according to at least one embodiment. As illustrated, the storage node 120, associated with a customer and hosting the volume data 106, can incorporate computer-executable instructions 300, that can be executed by a processor associated with a cryptography driver 302, to perform at least one cryptography operation on the volume data 106 hosted by the storage node 120. In at least one embodiment, the computer-executable instructions 300 are associated with the cryptography driver 302 of the storage node 120, which is responsible for carrying out cryptography operations on the volume data 106. For example, the computer-executable instructions 300 can be executed to encrypt or decrypt the volume data 106. To perform the cryptography operation, the computer-executable instructions 300 can be executed to identify cryptographic material, including at least keys and ciphertext, of metadata 304. Furthermore, the computer-executable instructions 300 can be executed to retrieve the first and second private keys 200 and 202. These first and second private keys 200 and 202 can be retrieved from the cryptography service 104 or from an external source identified by the customer, such as the computer-implemented storage 114. In at least one embodiment, the first and second private keys 200 and 202 are temporarily stored in the storage node 120, such as hosted by the cryptography driver 302, during a cryptography operation executed by the computer-executable instructions 300. In at least one embodiment, the storage is in volatile memory. Subsequent to the completion of the cryptography operation, or a plurality of cryptography operations, the first and second private keys 200 and 202 can be deleted from the storage node 120. This temporary storage of the first and second private keys 200 and 202 in the storage node 120 enhances the security and safety of the first and second private keys 200 and 202.

To provide various cryptography services for a customer's one or more storage nodes 120 that include volume data 106, the cryptography service 104 stores at least the first public key 204 and the second public key 206, and an ephemeral public key 204 and ciphertext 116 that are stored as ephemeral cryptographic material 210. The cryptography service 104 can provide the first public key 204, the second public key 206, the ephemeral public key 204, and the ciphertext 116 to the storage node 120 including the volume data 106, which stores the provided cryptographic material in the metadata 304 hosted by the storage node 120. The metadata 304 hosted by the storage node 120 can include an identifier 310 associated with an appropriate KDF usable in a key schedule to derive keys, based at least on the cryptographic material of the metadata 304 hosted by the storage node 120 including the volume data 106. The actual KDF can be retrieved or obtained by the storage node 120 from computer-implemented storage of the storage node 120. Thus, the storage node 120 can implement the KDF. For example, the KDF can implemented by computer-executable instructions in the storage node 120. When executed by a processor, such as a hardware or software implemented processor associated with the storage node 120, the computer-executable instructions perform one or more functions of the KDF. In at least one embodiment, the KDF is associated with the key schedule that is hosted by the storage node 120. In at least one embodiment, the KDF is HMAC-SHA-256 or HMAC-SHA-512 algorithm. In addition, the metadata 304 can include an information-parameter string 312. This info string 312, also referred to herein as info parameter or information parameter, can be an alphanumeric, numeric, or text string associated with the storage node 120. In at least one embodiment, the KDF associated with the KDF identifier 310 can a process the info string 312 as an input with the cryptographic material also processed by the KDF. In at least one embodiment, the info string 312 is used to bind the key material generated by the KDF to the storage node 120 and/or the volume data hosted by the storage node 120. In at least one embodiment, the info string 312 is used to prevent the derivation, by the KDF, of the same keying material for different contexts, such as storage nodes other than the storage node 120 and/or disparate volume data.

The storage node 120 can use the computer-executable instructions 300, via the cryptography driver 302, to perform a cryptography operation on the volume data 106 hosted by the storage node 120. For example, the computer-executable instructions 300 can be executed to encrypt or decrypt the volume data 106. To perform the cryptography operation, the computer-executable instructions 300 can be executed to identify the cryptographic material of the metadata 304. Furthermore, the computer-executable instructions can be executed to retrieve the first and second private keys 200 and 202. These first and second private keys 200 and 202 can be retrieved from the cryptography service 104 or from an external source identified by the customer, such as the computer-implemented storage 114.

The computer-executable instructions 300 can derive a classical shared secret and a post-quantum shared secret, illustrated as shared secrets 306. To derive the classical shared secret, the computer-executable instructions 300 use a classical key agreement protocol, such as the ECDH protocol or similar classical key agreement protocol. To derive the post-quantum shared secret, a decapsulation algorithm, such as Kyber KEM, is used by the computer-executable instructions to decapsulate the ciphertext 116 encapsulating the post-quantum shared secret 208. In at least one embodiment, the decapsulation algorithm processes as an input the second private key 202 to recover the ciphertext 116 encapsulated post-quantum shared secret 208.

The classical shared secret and the post-quantum shared secret can be used to generate two symmetric keys 308 usable to encrypt or decrypt the volume data 106 hosted by the storage node. In an example, the computer-executable instructions can be executed to use the KDF in a key schedule, for example, with the two concatenated shared secrets 306 and the info parameter provided when encrypting to generate the two symmetric keys 308 usable to encrypt or decrypt the volume data 106. In an example, the two keys 308 are usable with an XTS-AES encryption scheme to encrypt or decrypt the volume data 106. In a particular example, the two keys are 256 bit AES-256-XTS keys generated by the KDF in a key schedule. Once the two keys 308 are generated, the computer-executable instructions 300 can be executed by the storage node 120 to encrypt or decrypt the volume data 106.

Figure 4:
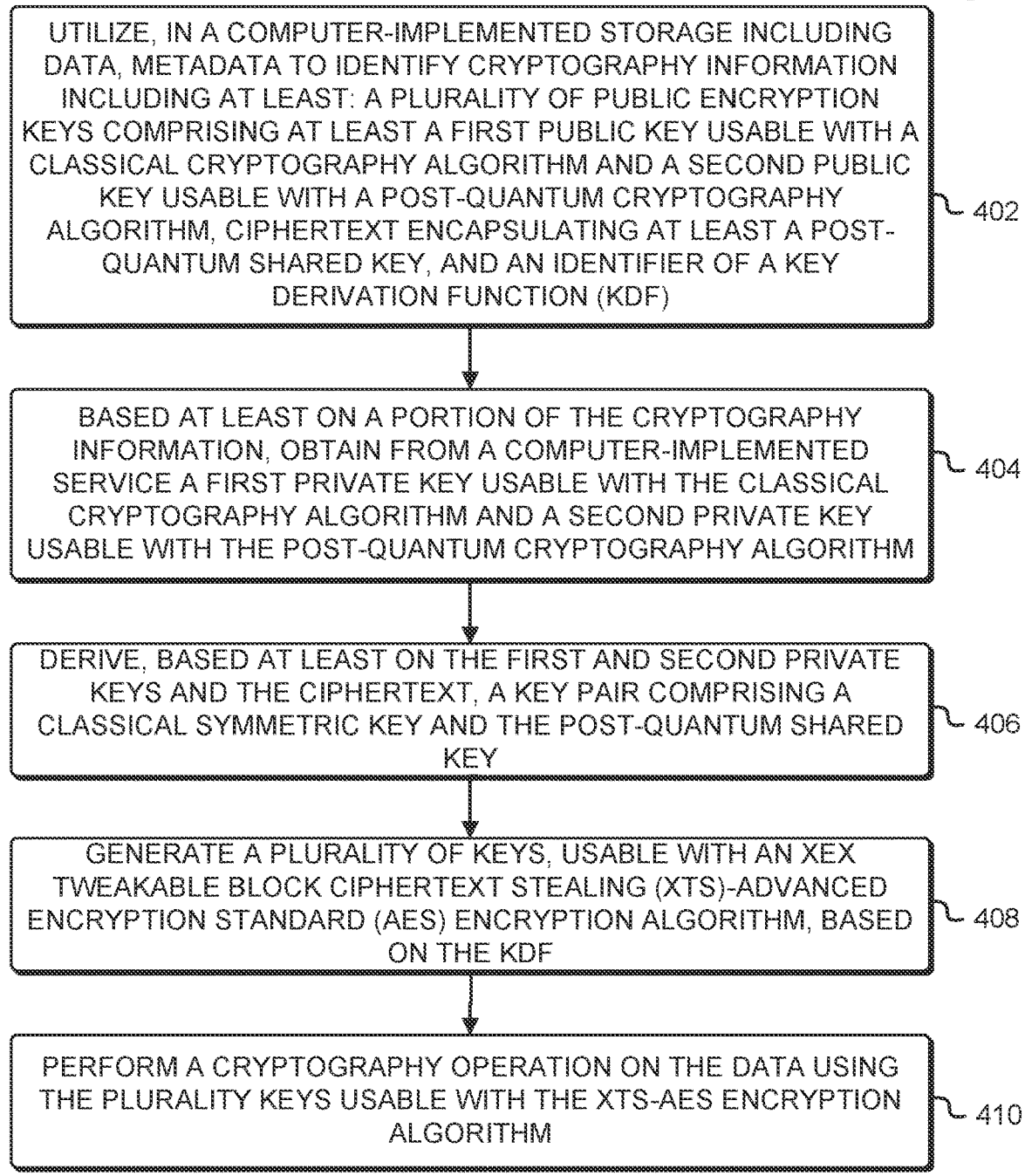
FIG. 4 illustrates an example flow diagram that may be associated with one or more of the described system environments to perform one or more cryptography operations for volume data, according to at least one embodiment.

FIG. 4 illustrates an example flow diagram 400 that may be associated with one or more of the described system environments to perform one or more cryptography operations for volume data, according to at least one embodiment. In some implementations, the acts of the flow diagram 400 are executed by one or more computing devices of the example system environments described herein. The example system environments may execute computer-executable instructions incorporating at least some of the processing acts of the flow diagram 400 to provide cryptography operations for volume data according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 402, metadata is utilized to identify cryptography information. In at least one embodiment, the cryptography information can include a plurality of public encryption keys including at least a first public key usable with a classical cryptography algorithm, an ephemeral public key usable with a classical cryptography algorithm and a second public key usable with a post-quantum cryptography algorithm, ciphertext encapsulating at least a post-quantum shared secret, and an identifier of a KDF with the info parameter. In at least one embodiment, the cryptography information is included in metadata. In at least one embodiment, the metadata can be hosted by a storage node that includes data for encryption or decryption. In at least one embodiment, the metadata is associated with the storage node 120. In at least one embodiment, the cryptography information is associated with the metadata 304.

At 404, based at least on a portion of the cryptography information, a computer-implemented service is used to obtain a first private key usable with the classical cryptography algorithm and a second private key usable with the post-quantum cryptography algorithm. In at least one embodiment, the first private key and the second private key are obtained from a cryptography service, such as the cryptography service 104. In at least one embodiment, the first private key and the second private key are obtained from a computer-implemented storage that is external of systems associated with an online service provider. In at least one embodiment, the first private key and the second private key are obtained from the computer having implemented storage 114.

At 406, a shared secret is created from a classical shared secret concatenated with the post-quantum shared secret. These shared secrets are derived based at least on the first and second private keys, the ephemeral public key and the ciphertext. In at least one embodiment, the classical shared secret is derived using a classical key exchange algorithm and the post-quantum shared secret is derived using a post-quantum cryptography decapsulation algorithm. In at least one embodiment, the classical shared secret is derived based on a private key and an ephemeral public key associated with a classical cryptography algorithm and a private key and the ciphertext associated with a post-quantum cryptography algorithm. In at least one embodiment, the shared secret corresponds to the shared secrets 306 concatenated together. In at least one embodiment, the cryptography driver 302 generates the shared secret. In at least one embodiment, the cryptography driver 302 leverages computer-executable instructions 300 to generate the shared secret. In at least one embodiment, after the generation of the shared secret, the first and second private keys can be removed from memory or storage, such as removed from memory or storage of the storage node 120.

At 408, a plurality of symmetric keys is generated, which are usable an XTS-AES encryption or cryptography algorithm, based on the KDF in a key schedule and the shared secret. In at least one embodiment, each of the keys of the plurality of keys is a 256-bit symmetric key. In at least one embodiment, each of the keys of the plurality of keys is quantum-safe. In at least one embodiment, the plurality of keys is generated by concatenating the classical and post-quantum shared secrets. In at least one embodiment, the plurality of keys is generated by a cryptography driver, such as the cryptography driver 302. In at least one embodiment, the cryptography driver executes computer-executable instructions, such as the computer-executable instructions 300, to generate the plurality of keys. In at least one embodiment, the plurality keys can correspond to the keys 308 hosted by the storage node 120.

At 410, a cryptography operation is performed on the data using the plurality keys usable with the XTS-AES encryption or cryptography algorithm. In at least one embodiment, the cryptography operation is an encryption operation that encrypts the data using the plurality of keys. In at least one embodiment, the cryptography operation is a decryption operation that decrypts the data, which is encrypted, using the plurality of keys. In at least one embodiment, the cryptography operation is performed by a cryptography driver, such as the cryptography driver 302. In at least one embodiment, the cryptography operation is performed by computer-executable instructions, such as the computer-executable instructions 300.

Figure 5:
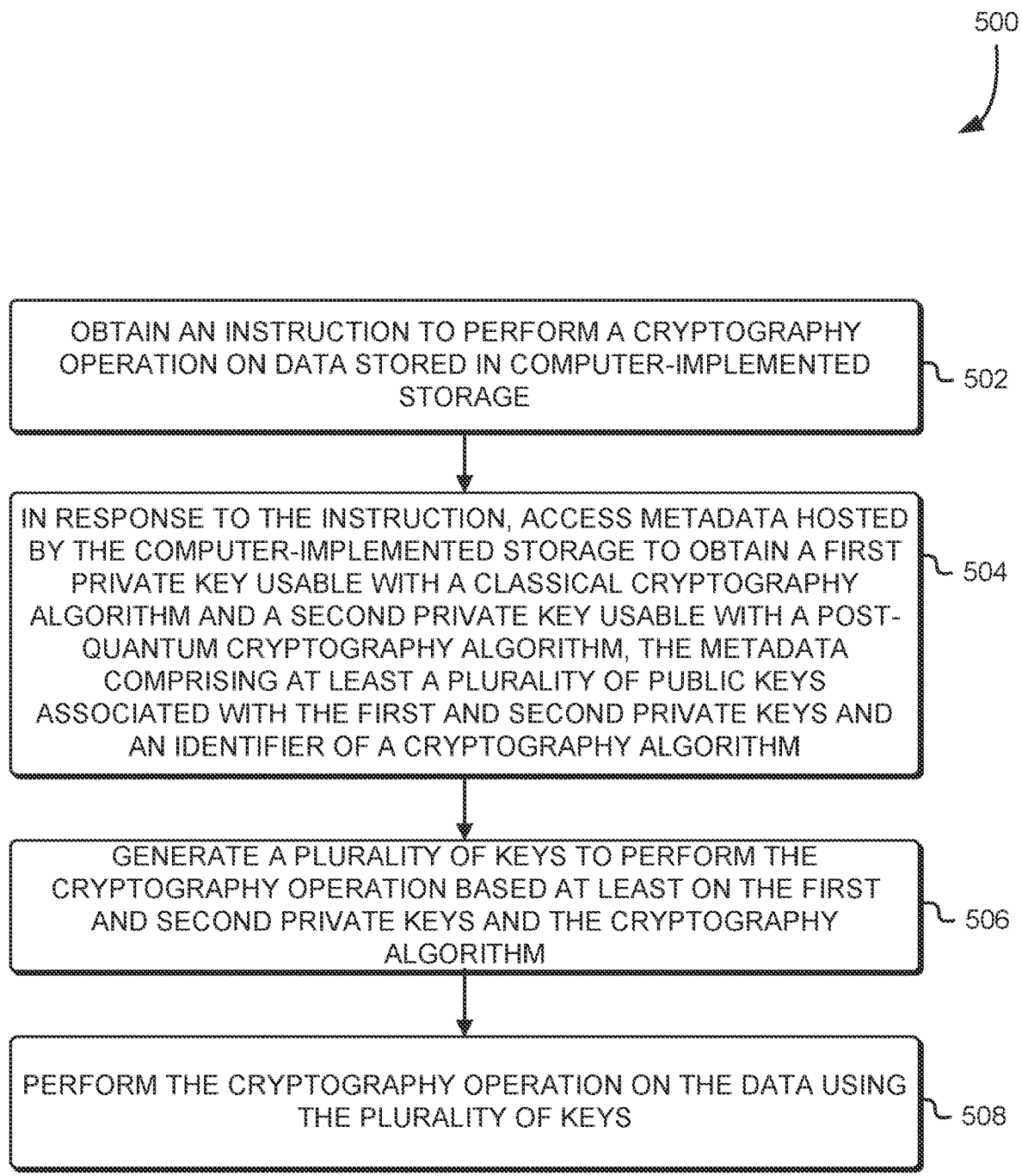
FIG. 5 illustrates an example flow diagram that may be associated with one or more of the described system environments to perform one or more cryptography operations for volume data, according to at least one embodiment.

FIG. 5 illustrates an example flow diagram 500 that may be associated with one or more of the described system environments to perform one or more cryptography operations for volume data, according to at least one embodiment. In some implementations, the acts of the flow diagram 500 are executed by one or more computing devices of the example system environments described herein. The example system environments may execute computer-executable instructions incorporating at least some of the processing acts of the flow diagram 500 to provide cryptography operations for volume data according to at least one of the embodiments described herein.

At 502, an instruction to perform a cryptography operation on data stored in computer-implemented storage is obtained. In at least one embodiment, the instruction is that provided by a computer-implemented service of an online service provider. In at least one embodiment, the instruction is generated by a KMS. In at least one embodiment, the instruction is generated by a cryptography service, such as the cryptography service 104. In at least one embodiment, the instruction is obtained by a storage node, such as the storage node 120. At least one embodiment, a cryptography driver of the storage node, such as the cryptography driver 302, obtains the instruction. In at least one embodiment, the instruction is generated by the driver 302. In at least one embodiment, there is no particular instruction needed to perform the cryptography operation. For example, the cryptography operation can be caused to execute when data stored in the computer-implemented storage is needed, such as when the data is to be read and/or written to or otherwise is to be augmented or changed.

At 504, in response to the instruction, metadata hosted by the computer-implemented storage is accessed to obtain a first private key usable with a classical cryptography algorithm and a second private key usable with a post-quantum cryptography algorithm, the metadata comprising at least a plurality of public keys associated with the first and second private keys, an ephemeral classical public key and a ciphertext and an identifier of a cryptography algorithm. In at least one embodiment, at least some of the contents of the metadata are used to identify the first private key and the second private key. In at least one embodiment, at least some of the contents of the metadata are identified to a cryptography service in order to obtain the first private key in the second private key. In at least one embodiment, the first private key and the second private key are obtained from the cryptography service, such as the cryptography service 104. In at least one embodiment, the first private key and the second private key are obtained from a storage external of systems of an online service provider, such as the computer-implemented storage 114. At least one embodiment, the metadata is hosted by a storage node that includes data for encryption or decryption. In at least one embodiment, the storage node corresponds to the storage node 120. At least one embodiment, the metadata corresponds to the metadata 304.

At 506, a plurality of keys is generated to perform the cryptography operation based at least on the first and second private keys, the metadata and the cryptography algorithm. In at least one embodiment, the plurality of keys is based on shared secrets, such as the shared secrets 306 of the storage node 120. In at least one embodiment, the plurality of keys corresponds to the keys 308 of the storage node 120. In at least one embodiment, the first and second private keys are used with the ephemeral public key and ciphertext in the metadata to generate the shared secrets, which in turn used to generate the plurality of keys to perform the cryptography operation. In at least one embodiment, the cryptography operation comprises an encryption operation or a decryption operation for data stored in a storage node, such as volume data 106 of the storage node 120.

At 508, the cryptography operation is performed on the data using the plurality of keys. In at least one embodiment, the cryptography operation comprises an encryption operation or a decryption operation for data stored in a storage node, such as volume data 106 of the storage node 120.

Figure 6:
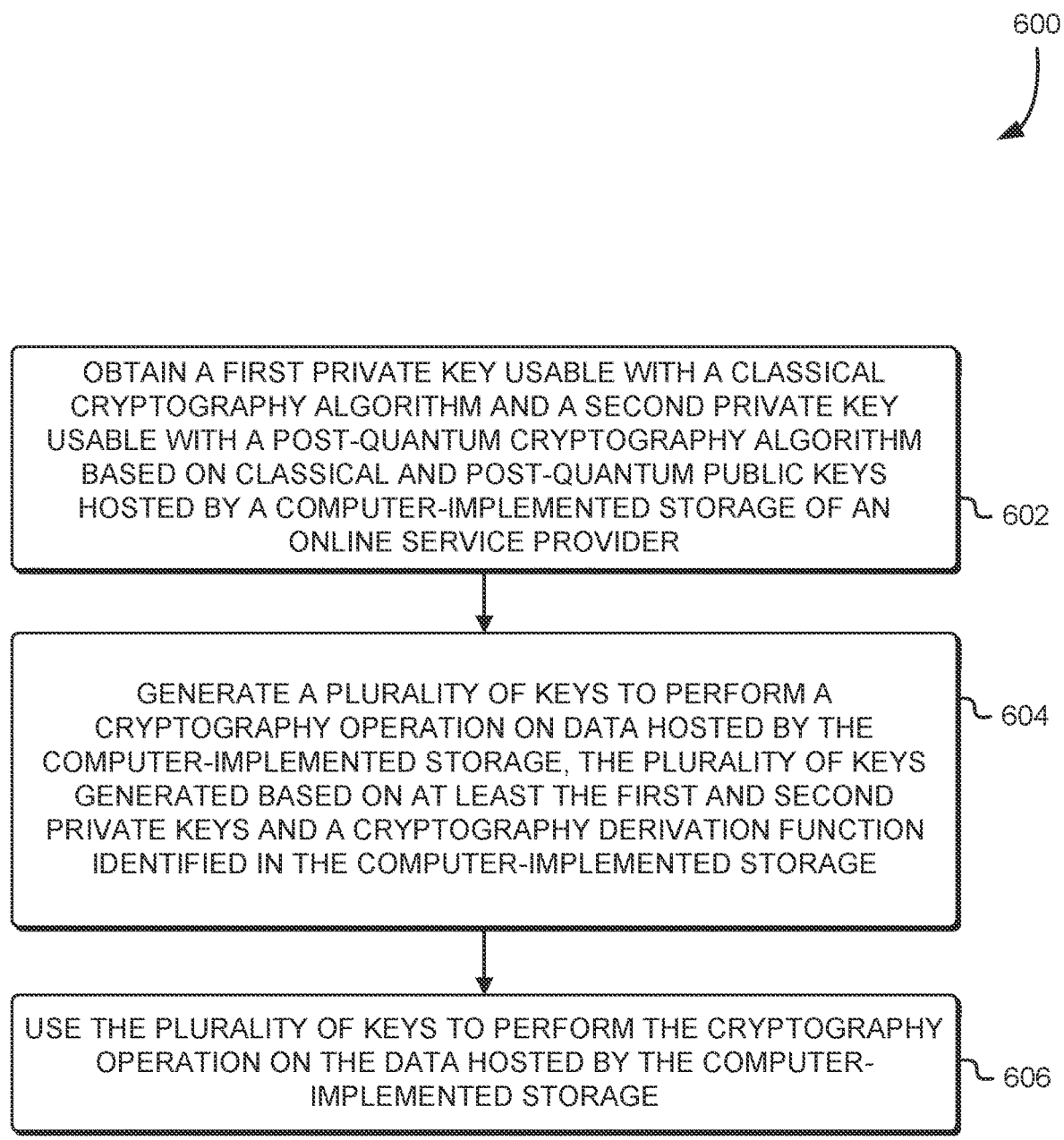
FIG. 6 illustrates an example flow diagram that may be associated with one or more of the described system environments to perform one or more cryptography operations for volume data, according to at least one embodiment.

FIG. 6 illustrates an example flow diagram 600 that may be associated with one or more of the described system environments to perform one or more cryptography operations for volume data, according to at least one embodiment. In some implementations, the acts of the flow diagram 600 are executed by one or more computing devices of the example system environments described herein. The example system environments may execute computer-executable instructions incorporating at least some of the processing acts of the flow diagram 600 to provide cryptography operations for volume data according to at least one of the embodiments described herein.

At 602, a first private key usable with a classical cryptography algorithm and a second private key usable with a post-quantum cryptography algorithm are obtained based on classical and post-quantum public keys hosted by a computer-implemented storage of an online service provider. In at least one embodiment, the classical and post-quantum public keys are identified in metadata of the computer-implemented storage. In at least one embodiment, the first private key and the second private key are identified using the metadata of the computer having implemented storage. In at least one embodiment, a service of an online service provider identifies the first private key and the second private key. In at least one embodiment, the service corresponds to the cryptography service 104. In at least one embodiment, the metadata is hosted by a storage node, such as the storage node 120. In at least one embodiment, the metadata corresponds the metadata 304 of the storage node 120. In at least one embodiment, the metadata comprises the public keys, ephemeral cryptographic material, ciphertext and a KDF identifier with the info parameter.

At 604, a plurality of keys to perform a cryptography operation on data hosted by the computer-implemented storage are generated, the plurality of keys generated based on at least the first and second private keys and a cryptography derivation function with the info parameter in a key schedule identified in the computer-implemented storage. In at least one embodiment, the plurality of keys is based on shared secrets, such as the shared secrets 306 of the storage node 120. In at least one embodiment, the plurality of keys corresponds to the keys 308 of the storage node 120. In at least one embodiment, the first and second private keys are used to generate the shared secrets, which in turn used to generate the plurality of keys to perform the cryptography operation. In at least one embodiment, the cryptography operation comprises an encryption operation or a decryption operation for data stored in a storage node, such as volume data 106 of the storage node 120. In at least one embodiment, the cryptography derivation function is a KDF. In at least one embodiment, the KDF is identified in metadata. In at least one embodiment, the metadata is associated with a storage node that includes the data. In at least one embodiment, the storage node corresponds to the storage node 120. At least one embodiment, the metadata corresponds to the metadata 304 of the storage node 120.

At 606, the cryptography operation is performed on the data using the plurality of keys. In at least one embodiment, the cryptography operation comprises an encryption operation or a decryption operation for data stored in a storage node, such as volume data 106 of the storage node 120.

Figure 7:
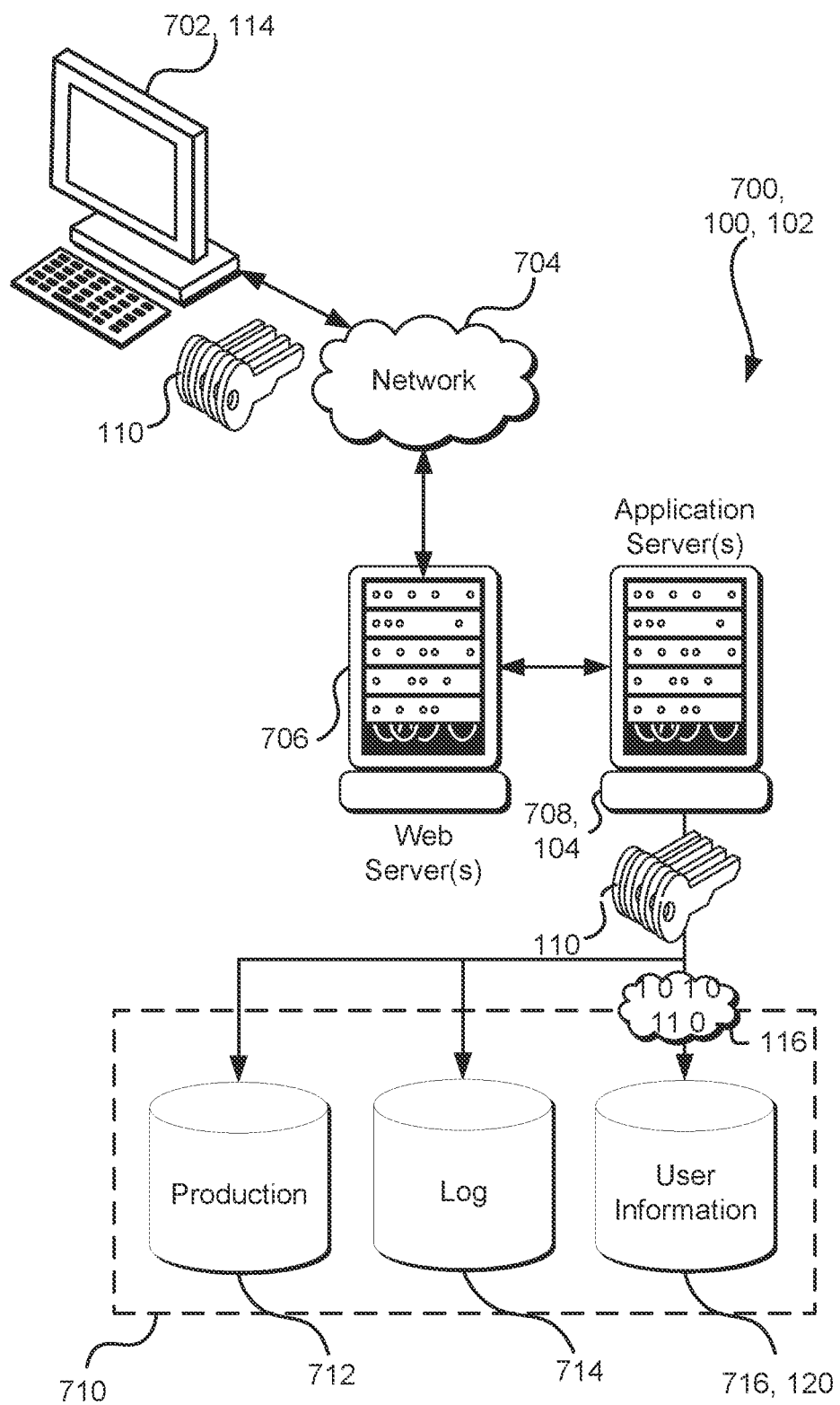
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma)

unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:
1. A computer-implemented method, comprising:
utilizing, in a computer-implemented storage including data, metadata to identify cryptography information including at least:
a plurality of public encryption keys comprising at least a first public key usable with a classical cryptography algorithm, an ephemeral public key usable with the classical cryptography algorithm, and a second public key usable with a post-quantum cryptography algorithm,
ciphertext encapsulating at least a post-quantum shared secret, and
an identifier of a key derivation function (KDF) and an information parameter;
based at least on a portion of the cryptography information, obtaining from a computer-implemented service a first private key usable with the classical cryptography algorithm and a second private key usable with the post-quantum cryptography algorithm;
deriving, based at least on the first and second private keys and the ephemeral public key and the ciphertext, a shared secret comprising a classical shared secret and the post-quantum shared secret;

generating a plurality of keys, usable with an XEX Tweakable Block Ciphertext Stealing (XTS)-Advanced Encryption Standard (AES) encryption algorithm, based on the KDF that at least is to process the shared secret and the information parameter as inputs; and performing a cryptography operation on the data using the plurality of keys usable with the XTS-AES encryption algorithm.

2. The computer-implemented method according to claim 1, further comprising executing an encapsulation algorithm to generate the ciphertext encapsulating at least the post-quantum shared secret, wherein the encapsulation algorithm is executed using the second public key.

3. The computer-implemented method according to claim 1, wherein deriving the post-quantum shared secret comprises executing a decapsulation algorithm on the ciphertext to determine the post-quantum shared secret, wherein the decapsulation algorithm is executed using the second private key.

4. The computer-implemented method according to claim 1, further comprising:
  in advance of deriving the shared secret, storing the first and second private keys in a volatile memory accessible by the computer-implemented storage including the data; and
  subsequent to generating the plurality of keys, removing the first and second private keys from the volatile memory negating access to the first and second private keys by the computer-implemented storage including the data.

5. A system, comprising:
one or more processors; and
memory that stores computer-executable instructions that, if executed, cause the one or more processors to:
  utilize metadata to identify cryptography information including at least:
    a plurality of public encryption keys comprising at least a first public key usable with a classical cryptography algorithm, an ephemeral public key usable with the classical cryptography algorithm, and a second public key usable with a post-quantum cryptography algorithm,
    ciphertext encapsulating at least a post-quantum shared secret, and
    an identifier of a key derivation function (KDF) and an information parameter;
  based at least on a portion of the cryptography information, obtain a first private key usable with the classical cryptography algorithm and a second private key usable with the post-quantum cryptography algorithm;
  derive, based at least on the first and second private keys and the ephemeral public key and the ciphertext, a shared secret comprising a classical shared secret and the post-quantum shared secret;
  generate a plurality of keys, usable with an XEX Tweakable Block Ciphertext Stealing (XTS)-Advanced Encryption Standard (AES) encryption algorithm, based on the KDF that at least is to process the shared secret and the information parameter as inputs; and
  perform a cryptography operation on data using the plurality of keys usable with the XTS-AES encryption algorithm.

6. The system of claim 5, wherein the memory that stores the computer-executable instructions that are executable by the one or more processors are further to cause the system to:
  communicate identifying information associated with the ephemeral public key and the second public key to a cryptography service; and
  in response to communicating the identifying information associated with the ephemeral public key and the second public key to the cryptography service, obtain the first private key and the second private key from the cryptography service.

7. The system of claim 5, wherein the memory that stores the computer-executable instructions that are executable by the one or more processors are further to cause the system to locate one or more of the cryptography algorithms using one or more identifiers comprised in the cryptography information, the cryptography algorithm implemented by the computer implemented storage comprising the data.

8. The system of claim 5, wherein the classical shared secret is concatenated with the post-quantum shared secret.

9. The system of claim 5, wherein the ciphertext is generated based on a post-quantum encapsulation function.

10. The system of claim 5, wherein deriving the post-quantum shared secret comprises executing a decapsulation algorithm on the ciphertext to determine the post-quantum shared secret, wherein the decapsulation algorithm is executed using the second private key.

11. The system of claim 5, wherein the memory that stores the computer-executable instructions that are executable by the one or more processors are further to cause the system to:
  obtain ciphertext from the metadata; and
  decapsulate the ciphertext using a post-quantum decapsulation function.

12. The system of claim 5, wherein the memory that stores the computer-executable instructions that are executable by the one or more processors are further to cause the system to:
  in advance of deriving the shared secret, store the first and second private keys in a volatile memory accessible; and
  subsequent to generating the plurality of keys, remove the first and second private keys from the volatile memory.

13. A non-transitory computer-readable storage medium storing thereon executable instructions that, as a result of being executed by one or more processors of a computer system, cause the computer system to at least:
  utilize metadata to identify cryptography information including at least:
    a plurality of public encryption keys comprising at least a first public key usable with a classical cryptography algorithm, an ephemeral public key usable with the classical cryptography algorithm, and a second public key usable with a post-quantum cryptography algorithm,
    ciphertext encapsulating at least a post-quantum shared secret, and
    an identifier of a key derivation function (KDF) and an information parameter;
  based at least on a portion of the cryptography information, obtain a first private key usable with the classical cryptography algorithm and a second private key usable with the post-quantum cryptography algorithm;
  derive, based at least on the first and second private keys and the ephemeral public key and the ciphertext, a shared secret comprising a classical shared secret and the post-quantum shared secret;

generate a plurality of keys, usable with an XEX Tweakable Block Ciphertext Stealing (XTS)-Advanced Encryption Standard (AES) encryption algorithm, based on the KDF that at least is to process the shared secret and the information parameter as inputs; and perform a cryptography operation on data using the plurality of keys usable with the XTS-AES encryption algorithm.

14. The non-transitory computer-readable storage medium of claim 13, wherein the instructions further comprise instructions that, as a result of being executed by the one or more processors, cause the computer system to:

communicate identifying information associated with the ephemeral public key and the second public key to a cryptography service; and in response to communicating the identifying information associated with the ephemeral public key and the second public key to the cryptography service, obtain the first private key and the second private key from the cryptography service.

15. The non-transitory computer-readable storage medium of claim 13, wherein the instructions further comprise instructions that, as a result of being executed by the one or more processors, cause the computer system to locate one or more of the cryptography algorithms using identifiers comprised in the cryptography information.

16. The non-transitory computer-readable storage medium of claim 13, wherein deriving the post-quantum shared secret comprises executing a decapsulation algorithm on the ciphertext to determine the post-quantum shared secret, wherein the decapsulation algorithm is executed using the second private key.

17. The non-transitory computer-readable storage medium of claim 16, wherein the instructions further comprise instructions that, as a result of being executed by the one or more processors, cause the computer system to execute an encapsulation algorithm to generate the ciphertext encapsulating at least the post-quantum shared secret, wherein the encapsulation algorithm is executed using the second public.

18. The non-transitory computer-readable storage medium of claim 13, wherein the instructions further comprise instructions that, as a result of being executed by the one or more processors, cause the computer system to locate one or more of the cryptography algorithms using one or more identifiers comprised in the cryptography information.

19. The non-transitory computer-readable storage medium of claim 13, wherein each of the plurality of keys is usable with the XTS-AES encryption algorithm to perform the cryptography operation on data hosted by a computer-implemented storage.

20. The non-transitory computer-readable storage medium of claim 13, wherein the instructions further comprise instructions that, as a result of being executed by the one or more processors, cause the computer system to:

store the first and second private keys in a volatile memory accessible; and remove the first and second private keys from the volatile memory to negate access to the plurality of keys.

\* \* \* \* \*